(12) United States Patent
Crew et al.

(10) Patent No.: US 6,532,550 B1
(45) Date of Patent: Mar. 11, 2003

(54) PROCESS PROTECTION SYSTEM

(75) Inventors: Albert W. Crew, Murrysville, PA (US); William D. Ghrist, III, Pittsburgh, PA (US); Carl A. Vitalbo, Pittsburgh, PA (US); Glenn E. Lang, Cabot, PA (US); Thomas Pierce Hayes, McMurray, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/501,804

(22) Filed: Feb. 10, 2000

(51) Int. Cl.$^7$ ................................................. H02H 3/05
(52) U.S. Cl. ......................................... 714/11; 714/797
(58) Field of Search .............................. 714/10, 11, 797

(56) References Cited

U.S. PATENT DOCUMENTS

| | | | | |
|---|---|---|---|---|
| 4,583,224 A | * | 4/1986 | Ishii et al. ...................... | 714/10 |
| 4,622,667 A | * | 11/1986 | Yount .......................... | 714/11 |
| 4,687,623 A | * | 8/1987 | Cook .......................... | 376/259 |
| 4,804,515 A | | 2/1989 | Crew et al. | |
| 5,394,409 A | * | 2/1995 | Barthel et al. .............. | 714/815 |
| 6,049,578 A | * | 4/2000 | Senechal et al. ............ | 376/215 |
| 6,253,348 B1 | * | 6/2001 | Davidsson et al. ......... | 714/797 |
| 6,367,031 B1 | * | 4/2002 | Yount .......................... | 714/11 |

OTHER PUBLICATIONS

Preckshot, G.G., "Method for Performing Diversity and Defense–in–Depth Analyses of Reactor Protection Systems", 12/94, pp. i–viii, 1–35, UCRL–ID–119239, *FESSP, Lawrence Livermore National Laboratory*, Livermore, CA.

* cited by examiner

*Primary Examiner*—Scott Baderman
*Assistant Examiner*—Joshua Lohn

(57) ABSTRACT

A protection system for a complex process has four redundant protection sets, each of which produces partial reactor trip and partial safeguard actuation signals in pairs of microprocessor-based controllers. Two independent and redundant voting logic trains are provided for the partial reactor trip signals, and two identical, independent and redundant voting logic trains are provided for the partial safeguard actuation signals. Each of the trains includes a pair of redundant microprocessor-based voting logic controllers, each of which receives the partial reactor trip or partial safeguard actuation signals from each of the process protection sets and has a voting processor which generates an intermediate reactor trip or intermediate safeguard actuation signal in response to partial signals from a predetermined number of protection sets. The intermediate signals from the two voting logic controllers in each train are ANDed to generate train signals. The reactor trip train signals are then ORed to generate a reactor trip signal. Each of the train safeguard actuation signals activates a separate set of redundant components.

7 Claims, 6 Drawing Sheets

PROCESS PROTECTION SYSTEM

BACKGROUND OF THE INVENTION

1. Field of the Invention

The invention relates to a protection system for a complex process, and particularly, for a nuclear reactor. The system includes redundant logic trains, each including redundant voting processors which apply voting logic on partial trip signals and partial safeguard function signals from a plurality of redundant process protection sets.

2. Background Information

Complex processes are typically controlled automatically with provision for various degrees of operator oversight appropriate for the application. Critical processes, such as nuclear reactors, are equipped with a protection system in addition to the automatic control system. The protection system shuts down the process and performs other functions which assure the safe condition of the process. For instance, in a nuclear reactor, the protection system trips the reactor by inserting shutdown rods into the reactor core to render the system subcritical. It also initiates a number of safeguard functions, such as for instance, injection of a moderator into the reactor coolant, containment isolation, containment spray and others.

Redundancy is provided in the protection system to assure safe operation despite equipment failures. It is common in protection systems for nuclear reactors to have four redundant protection channel sets. Some monitored process variables, such as certain pressures and temperatures, can be directly read. Others require calculation from measured values. The redundant channel sets each separately process the monitored process variables and generate what are referred to as partial trip and partial safeguard actuation signals. A voting system then generates a reactor trip or safeguard actuation signal based on the number of redundant partial signals generated compared to the number of channels monitoring that condition. The voting is adjusted when one channel set is taken out of service for maintenance or test. Thus, generation of the reactor trip or safeguard actuation signal can be based, for example, upon $2/4$, $2/3$, $1/2$ voting logic. Such voting logic increases the availability of the protection system.

It is known to have two trains of voting logic, each receiving partial trip and partial safeguard actuation signals from all of the channel sets, and with the trip or safeguard actuation signals being initiated in response to either train. This further assures availability and provides more flexibility for maintenance and testing.

Early protection systems were implemented with analog circuitry. Newer systems utilize solid state digital circuitry, and current systems are implemented with microprocessor-based controllers. Certain of such current systems utilize two diverse microprocessor-based controllers in each channel set such that primary and secondary protection functions of a given initiating event are processed in the separate controllers to enhance functional diversity.

Protection systems also include a set of indicators which present visual and/or audio indications of process conditions determined by the protection system for use by an operator monitoring the process and, if appropriate, to override the automatic system. The information generated by the protection system is also provided to an automatic monitoring system for use as a historical record and for post event analysis.

Many of the early analog protection systems are reaching the end of their useful lives, and replacement components are no longer available. There is also an interest in providing improved functionality and availability inherent with the current protection systems in the retrofits for the older systems.

Thus, there is a need for an improved complex process protection system and which can also be used as a retrofit for older existing systems.

There is a more specific need for such an improved protection system which provides improved availability.

More specifically, there is a need for such an improved protection system which not only assures that an appropriate response is made to an initiating event but also reduces the likelihood of an inadvertent abnormal condition which could lead to an automatic action or inappropriate override action by an operator.

SUMMARY OF THE INVENTION

These needs, and others, are satisfied by the invention which is directed to a protection system for a complex process such as, for instance, a nuclear reactor. The protection system includes a plurality of redundant process protection sets, each independently computing partial reactor trip and safeguard actuation signals. A voting logic system has two independent and redundant logic trains, each of which includes a pair of redundant microprocessor-based voting logic controllers. Each voting logic controller of each logic train, receives the partial protection signals from each of the process protection sets and has a voting processor which generates an intermediate protection signal in response to partial protection signals from a pre-determined number of the protection sets. Logic, associated with each logic train, generates a train protection signal only when each voting processor in the train generates an intermediate protection signal. Finally, an output device produces a protection output in response to a train protection signal from either of the logic trains.

Thus, the output device ORs the intermediate protection signals generated by the separate voting logic trains. As either logic train can trigger the protection signal, the system provides high reliability that a condition requiring action will receive an appropriate response. In addition, both of the voting processors in a logic train must agree that a protection action is needed in order for that logic train to generate an intermediate protection signal. In other words, the outputs of the two voting processors in a channel set are ANDed. This feature reduces the likelihood of a false automatic protection signal or a false indication which could be taken by the operator as a need for override action thereby reducing the availability of the process.

In the preferred embodiment of the invention, the protection signals generated by the system are both reactor trip signals and safeguard actuation signals. Separate redundant voting logic is provided in each logic train for reactor trip and safeguard actuation.

The protection system also includes an indication system which ANDs the intermediate protection signals from the two voting processors in each channel set to generate intermediate indicator signals. The intermediate indicator signals from the trains are ORed from the trains to generate indicator signals which are used to actuate indicators, such as, for example, annunciators, lights and outputs to a computer system.

Therefore, it is an object of the invention to provide an improved process protection system for a complex process.

It is a further object of the invention to provide such a system which can also be used to retrofit existing process protection systems while providing improved functionality and reliability. It is an additional object of the invention to provide such a system which also reduces the likelihood of inadvertent reactor trips or safeguard actuations.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention is directed to a protection system for a complex process and will be described as applied to a nuclear reactor. However, it will be evident to those skilled in the art that it has application to other types of complex processes.

Figure 1:
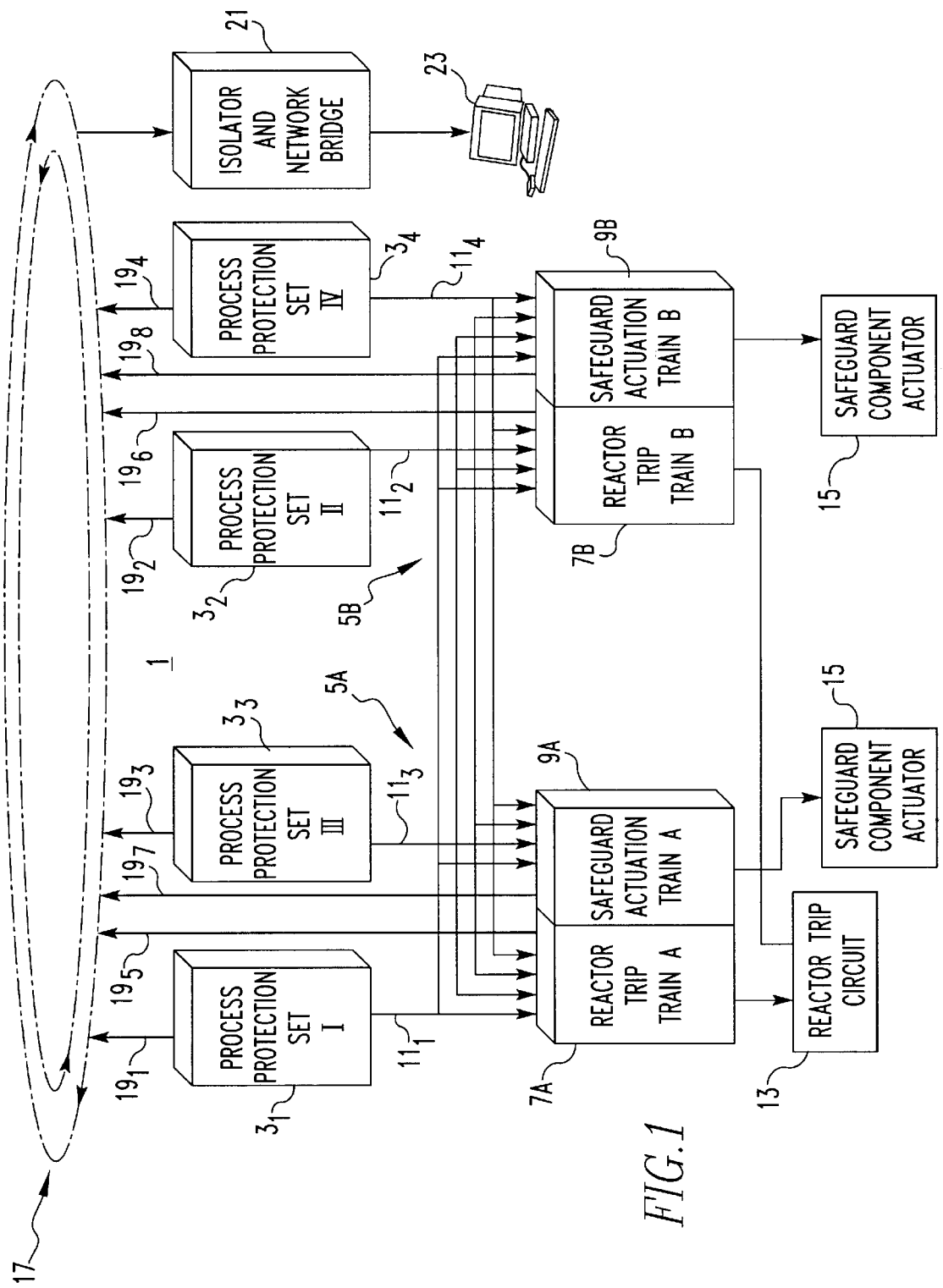
FIG. 1 is a simplified schematic diagram of a protection system in accordance with the invention in block form.

FIG. 1 provides an architectural overview of the process protection system 1 of the invention. The system includes a plurality of redundant process protection sets, in this case four protection sets, $3_1$–$3_4$. Each process protection set receives inputs (not shown) from the process, in this case a nuclear reactor, and processes these inputs to generate, as needed, partial protection signals. Partial protection signals include partial trip signals and partial safeguard actuation signals.

The partial protection signals generated by the protection sets $3_1$–$3_4$ are provided to the two voting logic trains 5A and 5B. Each of the voting logic trains 5A and 5B includes a reactor trip train 7A and 7B, and a safeguard actuation train 9A and 9B, respectively. Each of the train sections 7A, 7B, 9A and 9B receive the corresponding partial reactor trip and partial safeguard actuation signals from each of the process protection sets $3_1$–$3_4$ through optic fiber data links $11_1$–$11_4$. Each of the reactor trip voting logic trains 7A and 7B vote on the partial signals received from the process protection sets in a manner to be discussed in more detail. The train trip signals generated by the voting logic trains are applied to an output device in the form of a reactor trip breaker circuit 13. Similarly, the safeguard actuation train signals generated by the two voting logic trains are applied to safeguard component actuators 15.

This four process channel set, two logic train architecture generally follows the organization of the existing process protection systems (analog, relay or solid state) that it is designed to replace. This approach supports the task of analyzing the system for conformance to the original design bases of the plant being upgraded. It also supports the ability to upgrade portions of the safety system at separate times.

The system of FIG. 1 also includes an information network 17 which gathers information over transceiver cables $19_1$–$19_8$. As will be seen, there are actually two separate data networks which form the information network system 17. A bridge 21 links these two networks to a plant-wide network (not shown) containing human-machine interfaces (HMI) 23 such as workstations. The process protection sets $3_1$–$3_4$, the voting logic trains 5A and 5B, the reactor trip circuit 13, the safeguard actuation component actuators 15 and the information network system 17 are all safety related. The HMI 23 is not safety related and the network connection to the bridge 21 provides the proper isolation between safety and non-safety components.

Figure 2A:
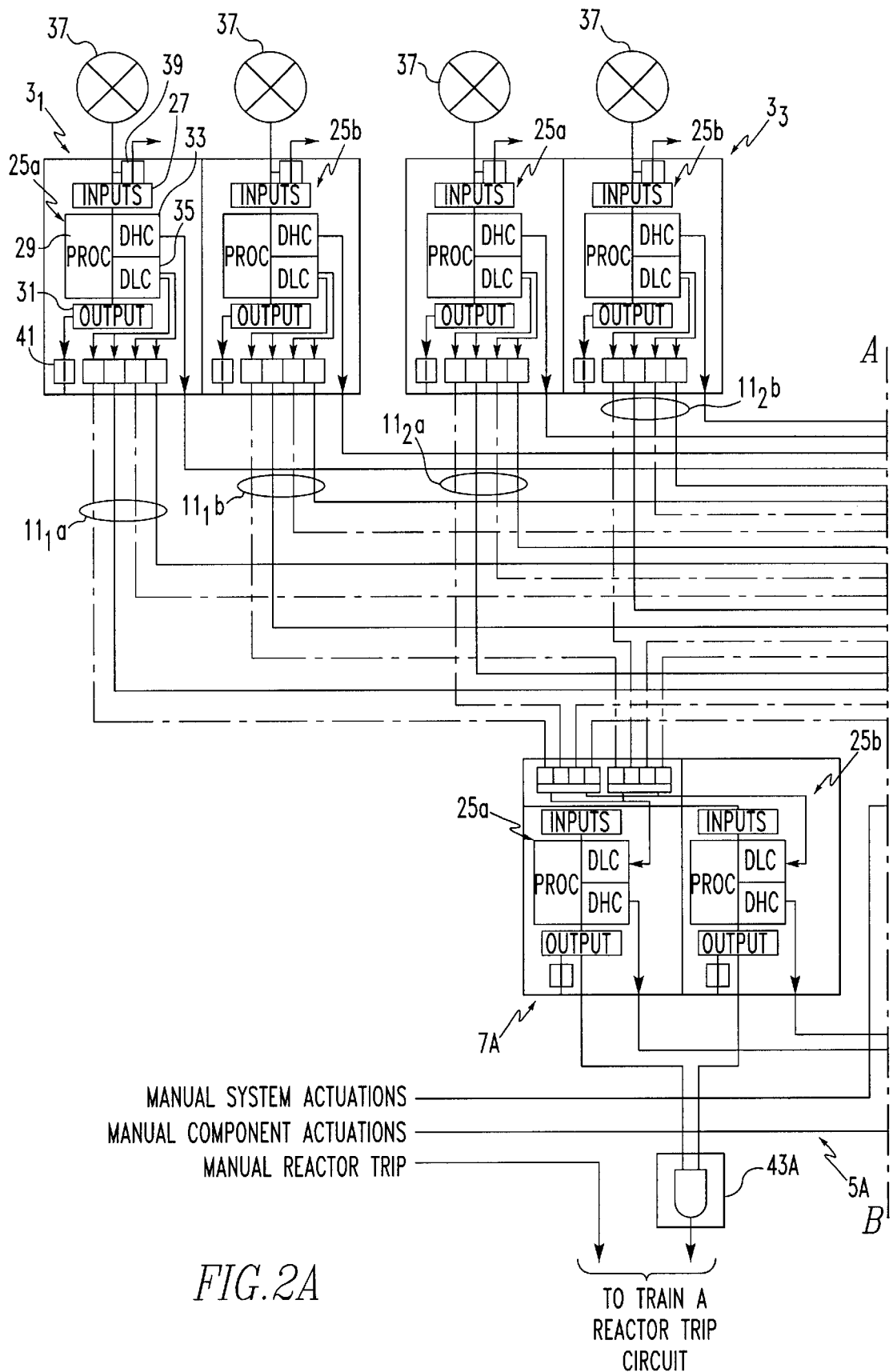
FIGS. 2A, 2B and 2C when placed side by side form a schematic diagram of the system of FIG. 1 in pertinent detail.
Figure 2B:
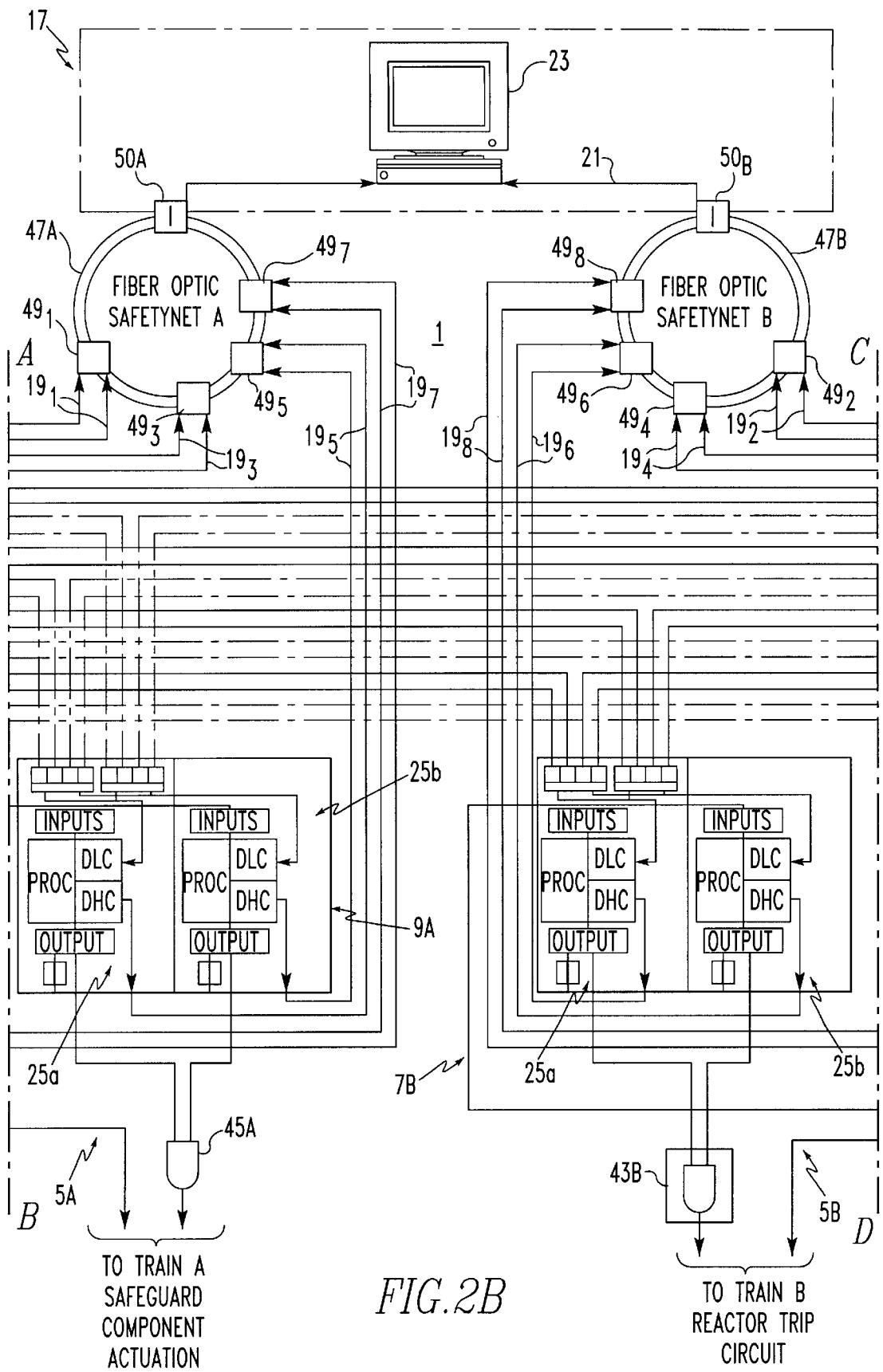
Figure 2C:
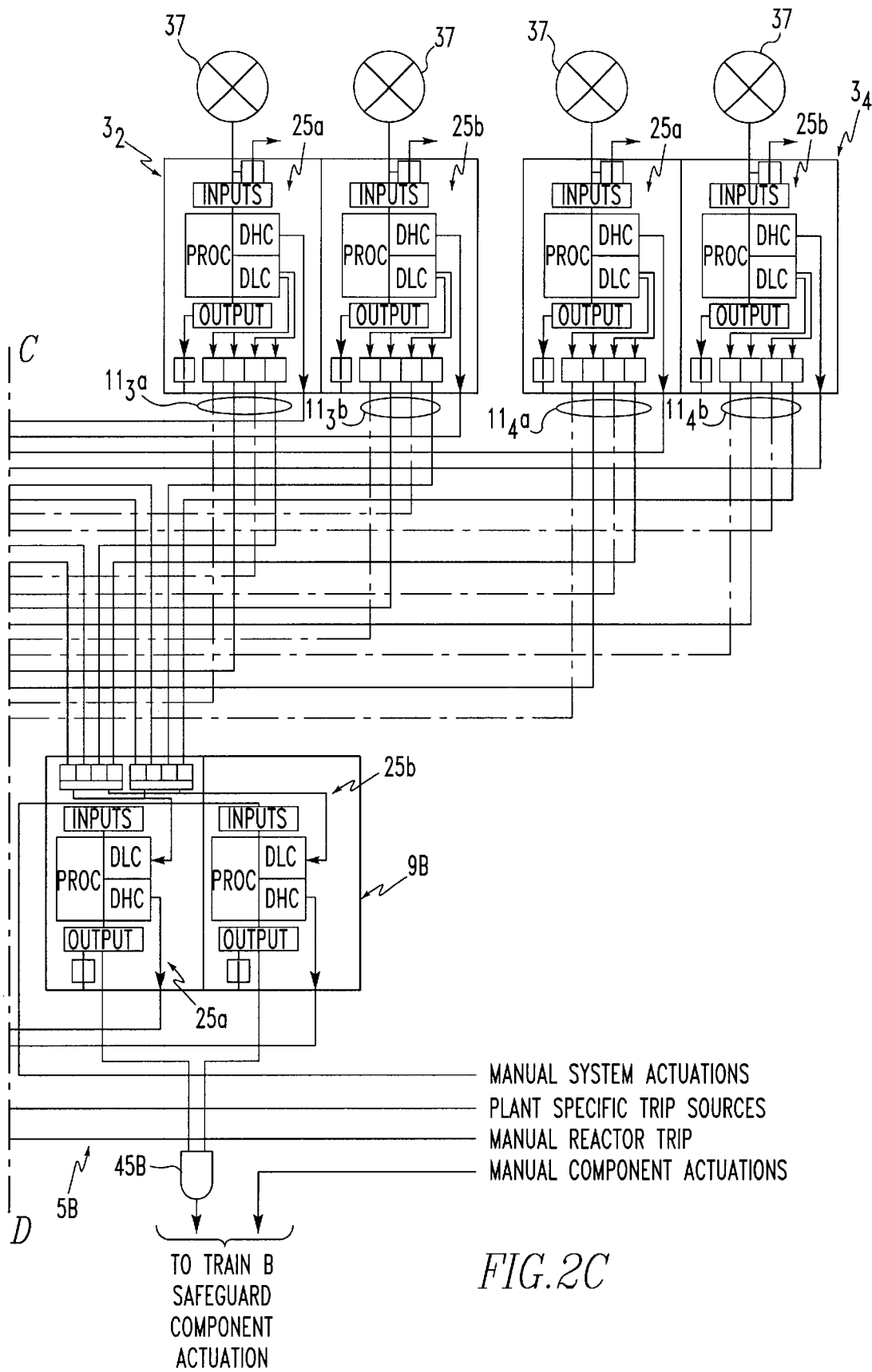

FIGS. 2A, 2B and 2C, when placed side by side, illustrate in more detail the process protection system of FIG. 1. As can be seen, each of the process protection sets $3_1$–$3_4$ includes a pair of microprocessor-based controllers 25a, 25b. The controllers 25a and 25b are preferably functionally diverse. Each of the controllers 25a and 25b includes input modules 27, a processor 29, output modules 31, a data highway controller (DHC) 33 and a data link controller (DLC) 35.

The microprocessor-based controllers 25a and 25b of the protection sets $3_1$–$3_4$ receive inputs from a variety of sensors and transducers 37 distributed throughout the reactor system. These raw sensor signals are output through an isolator 39 for use for instance by a control system (not shown). The controllers 25a and 25b process the sensors/transducer signals, and for some functions perform calculations utilizing one or more of the sensed parameters. For some abnormal states of the process, there are primary and secondary calculations which can detect abnormal conditions. In these situations, the primary calculation is made in one of the controllers 25a or 25b of the protection set, and the secondary calculation is made in the other. Some of the calculated parameters are used by the control system and are provided by the output board 31 through an isolator 41. Each of the controllers 25a and 25b generates both partial trip and safeguard actuation protection signals.

As can also be seen from FIGS. 2A–2C, the trip trains 7A and 7B of the voting logic trains 5A and 5B, each include a pair of redundant microprocessor-based controllers 25a and 25b like the microprocessor-based controllers in the process protection sets $3_1$–$3_4$. Likewise, the safeguard actuation trains 9A and 9B of the voting logic trains 5A and 5B also each include redundant microprocessor-based controllers 25a and 25b. Each of the microprocessors 25a and 25b of the process protection sets $3_1$–$3_4$ transmits through its data link controller 35 the partial reactor trip protection signals it has generated to each of the controllers 25a and 25b of each of the reactor trip train 7A and 7B over the associated optic fiber data link $11_1a$–$11_4b$. Each of these protection set controllers 25a and 25b also transmit each of their safeguard actuation protection signals through their data link controller 35 to the data link controllers of the microprocessor-based controllers 25a and 25b of each of the ESF trains 9A and 9B over the associated fiber optic data link 11.

Thus, the pairs of microprocessor-based controllers 25a and 25b and the two voting logic trains 5A and 5B receive partial reactor trip signals from each of the eight microprocessor-based controllers in the four process protection sets. Likewise, the pairs of microprocessor-based controllers in each of the safeguard actuation trains 9A and 9B receive the partial actuation signals from all eight of the protection set controllers. The processors 29 in each of the controllers of the trip trains 7A and 7B serve as voting processors which vote on the received partial trip signals.

While each voting processor receives partial trip signals from all eight protection set controllers, the two controllers, 25a and 25b, in each protection set $3_1$–$3_4$ generate partial trip signals on different conditions, so that the voting processors receive sets of four redundant signals for each trip function, one from each protection set. The voting processors then apply predetermined voting logic to the redundant sets of trip signals, such as ⅔, ⅔ and ½. As mentioned, the voting logic applied can change when a protection set is taken out of service for maintenance or test. In addition, some less critical functions may be performed only by two or three of the protection sets. If the predetermined number of partial reactor trip signals are detected by a voting processor, that voting logic controller will generate a function trip signal. Each voting logic controller separately applies its voting logic to the partial reactor trip signals for each reactor trip function with the results being ORed, so that if any reactor trip function satisfies the voting logic, an intermediate trip signal will be generated. The intermediate trip signals from the two voting logic controllers in each reactor trip train 7A and 7B are processed by AND logic 43A and 43B to generate a train reactor trip signal only if both controllers in the trip train generate an intermediate trip signal.

In a similar manner, the partial safeguard actuation signals from the eight controllers in the process protection sets $3_1$–$3_4$ are applied to each of the safeguard actuation controllers in the safeguard actuation trains 9A and 9B. However, as in the case of the reactor trip signals, the two safeguard actuation controllers 25a and 25b in each protection set generate different partial safeguard actuation signals, so there are at most four redundant partial safeguard actuation signals for any given function. The voting processors in the voting logic controllers of the safeguard actuation trains also apply predetermined ⅔, ⅔ and ½ voting logic as appropriate to generate intermediate safeguard actuation signals. As in the case of the reactor trip signals, the voting processors vote separately on the partial safeguard actuation signals for each safeguard function, with an intermediate safeguard actuation signal being generated if any safeguard actuation function satisfies the voting logic. The intermediate safeguard actuation signals from the pair of voting logic controllers in each safeguard train are processed by AND logic 45A and 45B to produce train safeguard actuation signals when intermediate signals are generated by each controller in the pair.

FIGS. 2A–2C also illustrate in more detail the information network system 17. As can be seen, this system includes two fiber-optic networks 47A and 47B. The two controllers of each of the protection sets $3_1$ and $3_3$ each are connected to the A network 47A by the transceiver cables $19_1$ and $19_3$ through fiber-optic transceivers $49_1$ and $49_3$. Similarly, the two controllers in each of the protection sets $3_2$ and $3_4$ are connected to the B fiber-optic safety network 47B by the transceiver cables $19_2$ and $19_4$ through the fiber-optic transceivers $49_2$ and $49_4$. The two fiber-optic networks 47A and 47B are linked through isolators 50A and 50B to the bridge 21 incorporated in a work station 23. As previously mentioned, the work station 23 is not safety related, while the information network system 17, together with the remainder of the system shown in FIGS. 2A–2C is safety related. The isolators 50 provide the required isolation between the safety and non-safety portions of the overall system. Each of the fiber-optic nets 47A and 47B also receives information from each of the controllers in the reactor trip trains and the safeguard actuation trains, through additional transceiver cables $19_5$–$19_8$ and additional fiber optic transceivers $49_5$–$49_8$.

Figure 3:
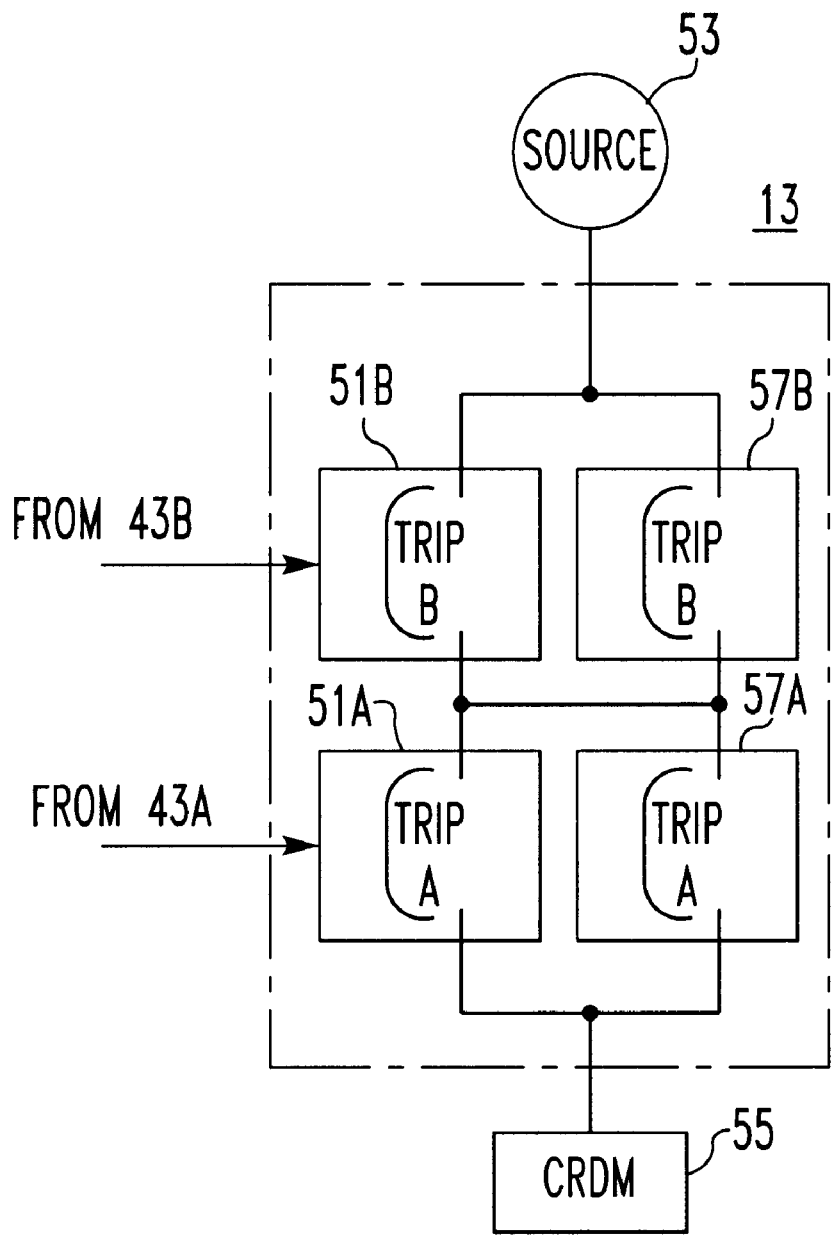
FIG. 3 is a schematic diagram of the reactor trip breaker circuit of the system shown in FIG. 1.

FIG. 3 illustrates a reactor trip breaker circuit 13 which forms one output device for the protection system. The reactor trip circuit 13 is implemented by a pair of trip circuit breakers 51A and 51B connected in series between the power source 53 and the control rod drive mechanism (CRDM) 55. Normally, both circuit breakers 51A and 51B are closed, so that the CRDM 55 is energized. The circuit breakers 51A and 51B are controlled by the reactor trip trains 7A and 7B. If AND logic 43A or 43B of either of the reactor trip trains 7A or 7B generates a train reactor trip signal, the corresponding train circuit breaker is opened to de-energize the CRDM 55, thereby tripping the reactor. Thus, the train reactor trip signals are ORed in the reactor trip circuit 13, so that the reactor is tripped if either train generates a train trip signal. This O-ring of the train trip signals assures that the reactor will be protected despite a single failure. Each of the trip circuit breakers 51A and 51B are shunted by a bypass circuit breaker 57A or 57B which permits the associated train to be taken out of service for maintenance or test.

The train safeguard actuation signals generated by the safeguard actuation trains 9A and 9B separately operate separate safeguard components such that the safeguard function is carried out in response to a safeguard actuation signal for that function from either train 9A or 9B.

Figure 4:
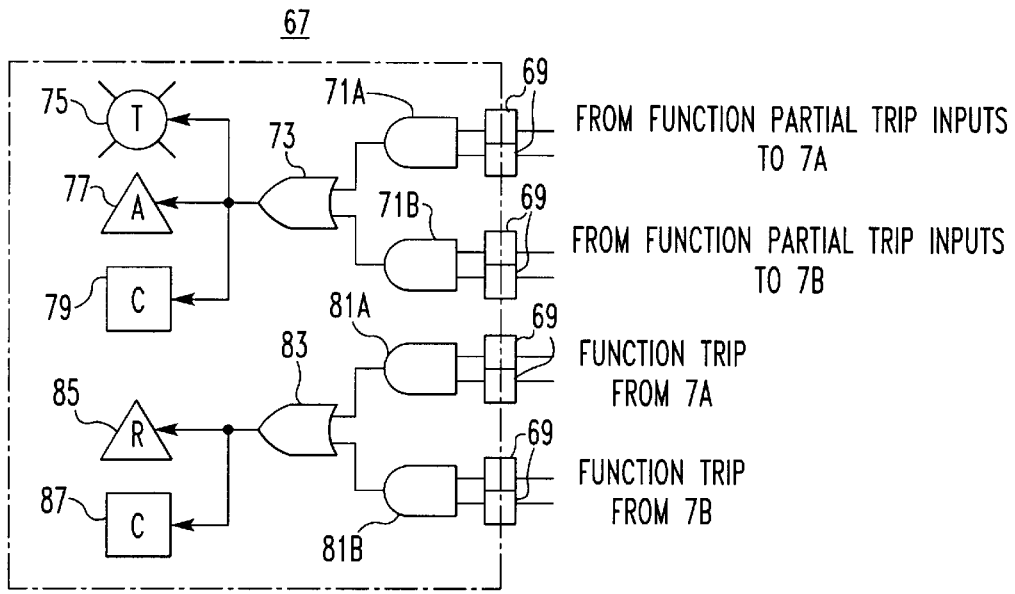
FIG. 4 is a schematic diagram of a partial protection signal indication and protection function indication circuit for the reactor trip function which forms part of the process protection system of the invention.

The protection system 1 also includes an indicator system which provides indication to the operator of the status of the protection system. This includes indications of function partial reactor trip signals, as well as corresponding function trip signals. FIG. 4 illustrates the additional indicator logic 67 providing the indicator function for the reactor trip train. For each reactor trip function, the partial trip signals generated by each protection set for the two controllers in the trip train 7A are applied through isolators 69 to an AND logic 71A, while the partial trip signals for the train 7B are also applied through isolators 69 to an AND logic 71B. The resulting signals are then ORed by the logic 73 to drive the indicators for that protection set's partial trip for the given reactor trip function. Typical channel partial trip indicators include status lights 75, an annunciator 77 and a computer point 79, such as in the plant computer system (not shown). Thus, a partial trip indicator for a particular protection set for a specific reactor trip function is only generated when partial reactor trip signals from that protection set for that protection function have been applied to both voting logic controllers in at least one of the two independent and redundant logic trains. Similar indicators are provided for the three partial trip signals generated by each of the other protection sets for each of the trip functions.

In addition, function specific reactor trip signals generated by the controllers in the trip train 7A are passed through isolators 69 and ANDed at 81A, while the corresponding signals from the B train are ANDed at 81B. Again, the resulting signals are ORed at 83 and used to drive an indicator, such as a reactor trip anunciator output 85 or another computer point 87. The isolators 69 are required to isolate the non-safety related indicators from the safety related voting logic. Thus, for each reactor trip function an indicator is actuated only when both voting processors in at least one of the two logic trains generate a function specific intermediate reactor trip signal.

Figure 5:
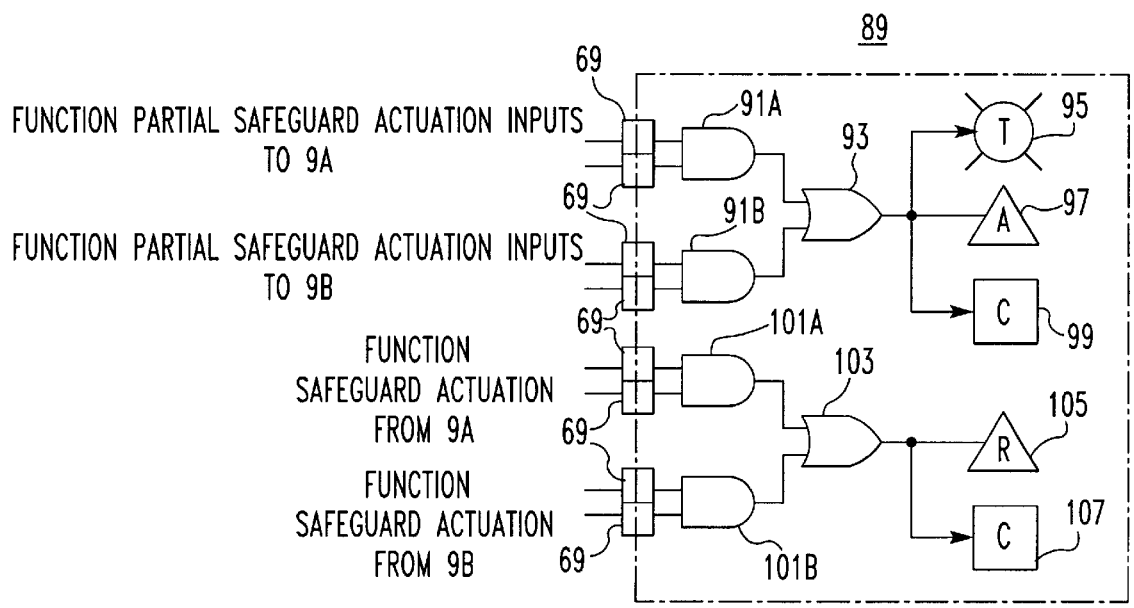
FIG. 5 is a schematic diagram of a similar indicator system for the emergency safety functions which form part of the process protection system of the invention.

Similar indicators are provided for the safeguard functions by the additional logic 89, illustrated in FIG. 5. Thus, for each of the safeguard functions, the function partial safeguard actuation signals for each function input by a protection set to the pair of voting logic controllers in each safeguard actuation train 9A and 9B, are passed through isolators 69 and ANDed at 91A and 91B, respectively, with the results ORed at 93 to drive an indicator such as 95, 97 or 99. Again, a similar set of indicators is provided for the three partial safeguard actuation signals generated by each protection set for each of the other partial safeguard actuations. Also, the function specific safeguard signals voted by the pair of controllers in each of the safeguard trains 9A and 9B are passed through isolators 69 and ANDed at 101A and 101B, respectively, with the results ORed at 103 to drive a function actuation indication, 105 or 107. Thus, the signals driving the indicators are first ANDed within the channels to reduce the spurious indications, and then ORed to reduce the effects of a single failure, just like the reactor trip and safeguard actuation signals.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A process protection system for a complex process comprising:

a plurality of redundant process protection sets, each independently computing partial protection signals;

a voting logic system having two independent and redundant logic trains, each logic train having a pair of redundant microprocessor based voting logic controllers, each voting logic controller of each logic train receiving said partial protection signals from each said process protection set and having a voting processor which generates an intermediate protection signal in response to partial protection signals, from a selected number of said protection sets;

logic associated with each logic train generating a train protection signal only when each voting processor in the train generates an intermediate protection signal; and an output device producing a protection output in response to a train protection signal from either of said logic trains.

2. The process protection system of claim 1 wherein said plurality of process protection sets generates partial protection signals in the form of partial reactor trip signals, said two logic trains each including a reactor trip logic train an generating intermediate reactor trip signal in response to said partial reactor trip signals from said selected number of said protection sets, and said logic means associated with each logic train generates a train reactor trip signal only when each voting processor in the train generates an intermediate trip signal, and said output device generates a reactor trip signal in response to a train reactor trip signal from either of said logic trains.

3. The process protection system of claim 2 wherein said logic includes indicator logic generating an associated partial trip indicator signal for each protection set for each trip function only when partial reactor trip signals from that protection set for that protection function have been applied to both voting logic controllers in at least one of said two independent and redundant reactor trip logic trains, and said output device includes a partial trip indicator device for each protection set for each trip function generating a partial trip indication for that protection set for that trip function in response to the associated partial trip indicator signal.

4. The process protection system of claim 3 wherein said voting processors in said reactor trip logic trains generate function specific intermediate trip signals for each reactor trip function and said indicator logic includes additional indicator logic generating a function specific reactor trip signal for a specific reactor trip function only when both voting processors in at least one of said reactor trip logic trains generate a function specific intermediate trip signal for that specific trip function.

5. The process protection system of claim 2 wherein said plurality of protection sets also generate partial protection signals in the form of partial safeguard actuation signals, said logic trains also comprise safeguard actuation logic trains each including a pair of redundant microprocessor-based additional voting logic controllers, each additional voting logic controller of each safeguard actuation logic train receiving said partial safeguard actuation signals from each of said process protection sets and having an additional voting processor which generates an intermediate safeguard actuation signal in response to partial safeguard actuation signals from a preselected number of said process protection sets, said logic means associated with each logic train comprising additional logic means generating a train safeguard actuation signal only when each additional voting processor in the safeguard actuation logic train generates an intermediate safeguard actuation signal.

6. The process protection system of claim 5 wherein said logic includes indicator logic generating an associated partial safeguard actuation indicator signal for each protection set for each safeguard actuation function only when partial safeguard actuation signals from that protection set for that protection function have been applied to both voting logic controllers in at least one of said two independent and redundant safeguard actuation logic trains, and said output device includes a partial safeguard actuation indicator device for each protection set for each safeguard actuation function generating a partial safeguard actuation indication for that protection set for that safeguard actuation function in response to the associated partial safeguard actuation indicator signal.

7. The process protection system of claim 6 wherein said voting processors in said safeguard actuation logic trains generate function specific intermediate safeguard actuation signals for each safeguard actuation function and said indicator logic includes logic generating a function specific safeguard actuation signal for a specific safeguard actuation function only when both voting processors in at least one of said safeguard actuation logic trains generate a function specific intermediate safeguard actuation signal for that specific safeguard actuation function.

* * * * *